United States Patent [19]

Stehle et al.

[11] 3,880,406

[45] Apr. 29, 1975

[54] PLASTIC TRAFFIC BARRICADE

[75] Inventors: John J. Stehle; Robert E. Davis, both of Palatine, Ill.

[73] Assignee: Best Barricade Company, Inc., Palatine, Ill.

[22] Filed: July 15, 1974

[21] Appl. No.: 488,531

[52] U.S. Cl. ................................. 256/64; 116/63 P
[51] Int. Cl. ............................................ E01f 13/00
[58] Field of Search ................................. 256/64, 1; 404/6–9; 116/63 P

[56] References Cited
UNITED STATES PATENTS

| | | | |
|---|---|---|---|
| 2,719,506 | 10/1955 | Sequeira | 116/63 P |
| 2,882,021 | 4/1959 | Dreher | 256/64 |
| 3,456,100 | 7/1969 | Green | 256/64 X |
| 3,506,959 | 4/1970 | Nunn | 256/64 X |
| 3,740,881 | 6/1973 | Finger | 116/63 P |

*Primary Examiner*—Dennis L. Taylor
*Attorney, Agent, or Firm*—Barry L. Clark

[57] ABSTRACT

Plastic traffic barricade is very resistant to damage from being struck by vehicles. When struck by a vehicle, the barricade generally collapses and falls under the vehicle resulting in no damage to the vehicle. The front and rear panels formed by rotational casting are hollow and include legs and cross-bars which are adapted to be filled with ballast such as sand to resist tipping over. The panels are self hinged to each other below an integral vertical reflector panel to further increase their stability. An integrally molded container for a flasher helps to protect the vehicle and the flasher in the event of a collision and also protects the flasher against unauthorized removal.

9 Claims, 5 Drawing Figures

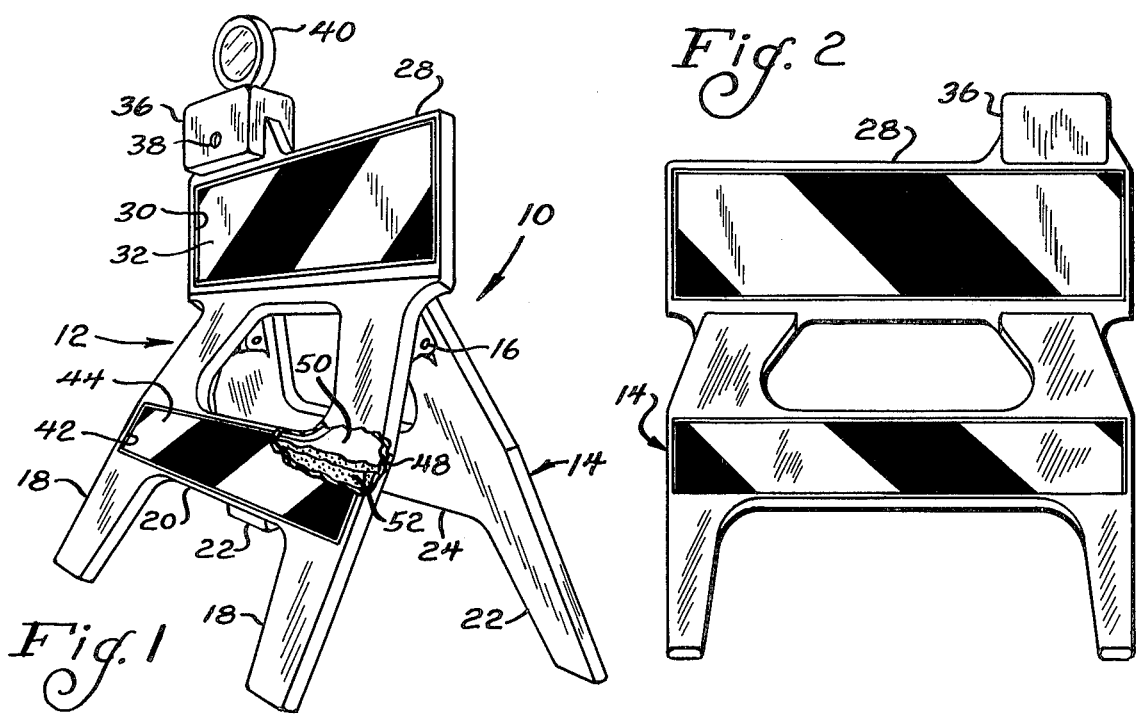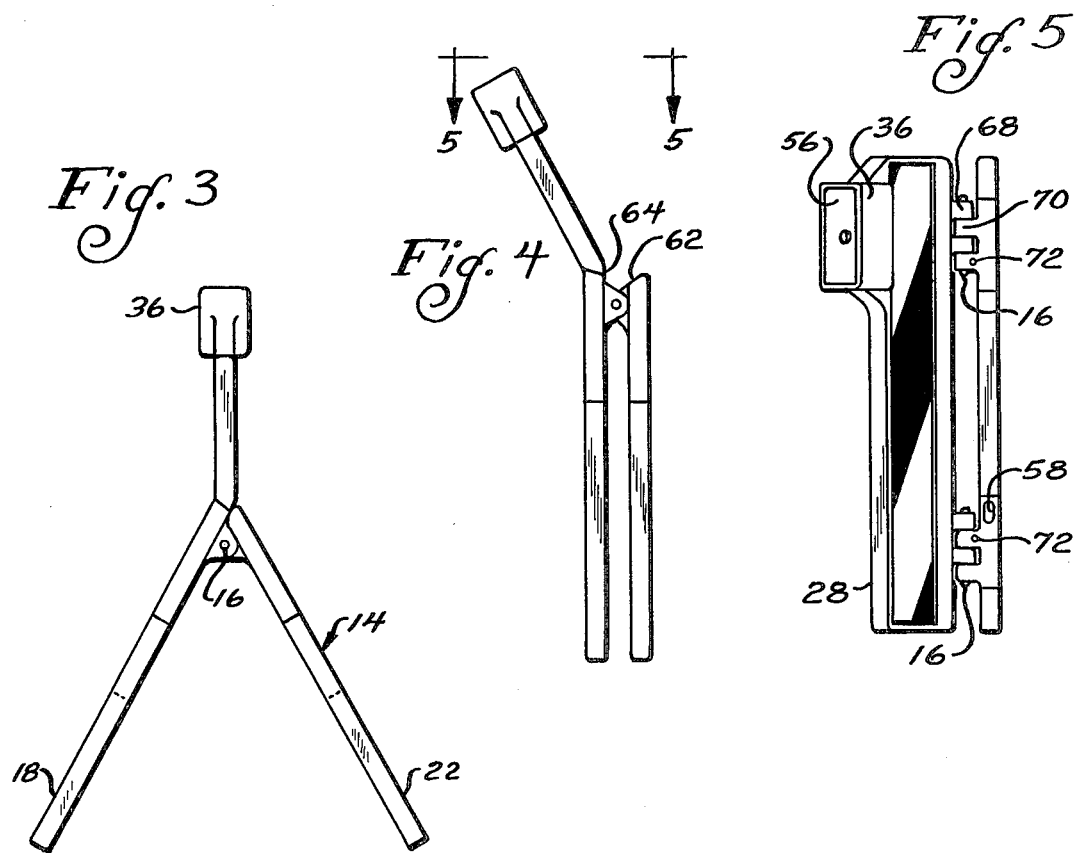

PLASTIC TRAFFIC BARRICADE

BACKGROUND OF THE INVENTION

This invention relates to barricades of the type used beside roadways during construction to channelize traffic toward a desired path of travel and to warn approaching vehicles of holes and other dangerous situations. Conventionally, such devices have been made of metal or wood or combinations thereof which are hinged at the top to permit the units to be collapsed to conserve space during transportation and storage. Since the units invariably have a high center of gravity they are commonly weighted with sand bags laid across their lower cross-bars to increase their stability and make them less likely to blow over. Although Federal Highway Administration standards require that the devices not inflict any severe damage to a vehicle that inadvertently strikes them, the typical unit now in use can be extensively damaged or destroyed when struck and can cause extensive damage to the striking vehicle. In some situations, the inherent high center of gravity results in the unit being lifted up on the hood of a vehicle following impact rather than merely being collapsed under the vehicle. In such a situation the windshield can be broken and the vehicle occupants severely injured.

Barricades typically include one or more panels of warning indicia such as reflecting stripes which are black and white or orange and white. In most units the striped material comprises reflective pressure sensitive tape attached to the face of a flat panel although the stripes can also be painted or made from glass beads. The reflective tape is quite expensive and often needs to be replaced at relatively short intervals due to being damaged by abrasion during transit when the units are piled on top of each other. The tape can also be peeled off relatively easily by vandals since its edges are exposed. In units wherein the striped reflecting surface is in a non-vertical plane by virtue of being attached to a cross-member attached to the barricade's angled legs, wear is even faster due to increased exposure to the elements and to dirt raised during construction. Such non-vertical surfaces are also more difficult to see since rays from a vehicle's lights are reflected up rather than back. In those instances where a flasher unit is mounted on a barricade the flasher unit is usually mounted in an unprotected manner at the top of the barricade where it is vulnerable to damage from tipping over or from vehicle impact as well as being quite accessible to a thief.

SUMMARY

It is an object of the present invention to provide a traffic barricade which is extremely safe to an impacting vehicle and is itself resistant to damage.

It is another object of the invention to provide a traffic barricade having a lower center of gravity than conventional units so as to be more stable against tipping over and less likely to be lifted onto the hood of a vehicle when struck.

It is a further object of the invention to provide a traffic barricade in which the striped reflective portions and flasher unit are protected from the elements and from vandals.

It is yet another object of the invention to provide a traffic barricade which can be weighted down with ballast either internally or externally in order to prevent tipping.

It is a still further object of the invention to provide a traffic barricade which not only presents an esthetically pleasing appearance but is easy and comfortable to carry by hand without presenting a danger of cuts, scratches or splinters.

These and other advantages are attained by the improved barricade of the present invention. The barricade is formed of plastic which is preferably rotationally cast so that the interior is hollow and the walls are of uniform thickness and without seams. The plastic which is used should have a capability of resisting deterioration such as cracking under severe weather conditions for many years and should be resilient and highly resistant to impact. Examples of suitable plastics are ethylene vinyl acetate, polyvinyl chloride, low density polyethylene and cross linking polyethylene.

The principal embodiment of the invention comprises a pair of molded plastic panel members, one of which is taller than the other. Each panel comprises a leg at each end and a connecting horizontal cross-bar at about the center of the legs. The upper ends of the legs include integral hinge means which cooperate with each other to permit the panels to be folded or collapsed into parallel relationship for storage and transportation purposes. Cooperating stop means on the panels limit the degree to which they can be pivoted apart at the integral hinge means and thus define their angle of opening. A vertical reflector panel portion integral with the taller panel member has a recessed flat surface which carries a strip of striped, reflector surfaced pressure sensitive tape. The vertical reflector panel portion is formed at an angle relative to the plane of the legs and cross-bar on the taller panel member so that it will be positioned vertically when the hinged panel members are in their position of use. A flasher housing is preferably formed in the taller panel at one upper end of the reflector panel portion. A hole in the center of the flasher housing accepts a fastener bolt which locks the flasher unit inside the housing.

Since the legs and cross-bars are hollow as a result of being rotationally cast, they may be filled to any desired depth with ballast such as sand or water to increase the stability of the barricade. The ballast can be added to the taller panel through the flasher holder opening and to the shorter panel through an aperture in the top of one leg. The cross-bars are also sufficiently strong to support the weight of sand bags which can be laid across them either to supplement internal ballasting or as a substitute for it. However, internal ballasting is greatly to be preferred since one great problem with prior art barricades is that the sand bags get taken, or are not available when needed, or fall off, with the resulting effect that the barricade can blow over and possibly be damaged by a vehicle or cause damage to one.

BRIEF DESCRIPTION OF THE DRAWINGS

FIG. 1 is a front and side perspective view of the improved barricade with a portion broken away to show the interior;

FIG. 2 is a rear view of the barricade shown in FIG. 1;

FIG. 3 is a left side view of the barricade shown in FIG. 2;

FIG. 4 is a left side view similar to FIG. 3 except that the barricade is folded to its storage position; and FIG. 5 is a top view of the folded barricade shown in FIG. 4.

DETAILED DESCRIPTION

Referring to the drawings, the improved plastic traffic barricade 10 basically comprises a hollow tall panel 12 hinged to a hollow short panel 14 by a pair of plastic hinge pins 16. The tall panel 12 includes a pair of hollow leg portions 18 and a cross-bar 20 which connects them. The short panel 14 also includes a pair of hollow leg portions 22 and a connecting cross-bar 24. The longer panel 12 has a hollow vertical panel 28 integrally formed at its top. The vertical panel is recessed as shown at 30 on its flat surfaces for receipt of a strip of reflective pressure sensitive tape 32 which includes warning indicia such as the stripes shown. An open topped receptacle 36 is formed at one end of the top of vertical panel 28. An aperture 38 in the receptacle 36 is adapted to receive a special fastener (not shown) for attaching an auxiliary flasher unit 40 to the barricade when the use of such a unit is desirable. The cross-bar 20 is recessed at 42 for receipt of a reflective tape 44. The recesses 30 and 42 help to protect the surface of the expensive tape 32,44 during handling of the barricades such as when they are stacked together to be transported to a job site. The recesses provide a slight shielding of the tape from the elements but are most effective in that they restrict access to the edges of the tape and thus protect the tape to some degree from vandals who might try and pull it off or from accidental peeling during handling.

As can be seen in the broken away portion of FIG. 1, the walls 48 of the barricade 10 are relatively thin and define a hollow space 50 which can be filled to any desired height with ballasting material such as sand 52. The sand may be easily loaded into the taller panel 12 through the opening 56 (FIG. 5) in flasher box 36. The sand for the shorter panel 14 is loaded through an aperture 58 formed in the top of one or both of the legs 22. Rain is prevented from entering the aperture 56 when a flasher unit 40 is in place while access to aperture 58 is prevented when the unit is in its FIG. 3 use position. Rain that does enter the hollow interior areas is readily evaporated when the barricade is exposed to the sun.

FIGS. 3–5 illustrate the barricade unit in its open and closed configurations. Cooperating stop means 62,64 on the short and tall panel members contact each other to limit the opening angle of the unit while cooperating hinge lugs 68,70 integrally formed on the tall and short panel members cooperate with a hinge pin 16 to permit the unit to be opened and closed. The pin 16 is preferably formed of a soft plastic rod such as polyethylene which has its ends upset by heat. Holes 72 are vent holes used to prevent internal pressure during molding of the plastic panels.

Since the barricade is made of soft, hollow, resilient plastic members such as low density polyethylene, it will be readily appreciated that it is highly unlikely that the plastic unit per se could cause any damage to a vehicle, even at speeds as high as 55 mph. Furthermore, we have subjected a single unit which is ballasted with 18 pounds of sand, sufficient to fill the legs to the height of the bottom of the cross-bar, to more than 25 direct and glancing impacts from small and large cars and also from trucks with no significant damage to the barricade, even though the vehicle wheels have passed over it. Unlike conventional metal and wood units which have a high center of gravity, our unit has a center of gravity, even when unballasted, which is lower than the height of a car bumper. The center of gravity is much lower when ballast is added since the ballast weight is all near the ground. The total weight of our unit without ballast is only about 15 pounds or about one half the weight of conventional units. This light weight saves on shipping expense and makes the units quite easy to carry. Being made of plastic the unit can also be molded of any color. Thus, it is possible for the body of the unit to be orange, for example, to provide outstanding visibility. Since the color is molded in there is never any need for repainting. By forming the unit with rotational casting techniques the walls are very uniform and no seams are introduced. Thus, the unit is extremely strong for its weight.

We have found that a barricade made in accordance with this invention which is 36 inches high to the top of the panel 28 and 36 inches wide weighs only about 15 pounds. On this unit the panels are about 1.75 inches thick with the wall thickness averaging 0.125–0.187 inch. Since the hinge pins 16 are only about 23 inches above the ground it is quite obvious that the center of gravity of the entire unit, with or without ballasting will be below the normal 20 inch height of an automobile bumper. The low center of gravity is very important because it helps to prevent the unit from tipping over and insures that the unit will go under the vehicle that hits it rather than being lifted up on the hood. The internal ballasting feature is also important since it eliminates the problem with conventional barricades of having the ballast bags fall off, taken, or not used in the first place.

Although the unit is shown with a single flasher holder box 36 formed at one end of the vertical panel 28, it could of course also be made with a flasher holder at each end or none at all, depending upon the user's requirements. Also, the unit is illustrated as having two strips of reflective tape 32,44 on each side. This configuration is referred to as a Type II barricade. For many situations, the extra warning capability of the lower reflective strip is not required so the lower strip 44 can be left off. Such a barricade having only an upper reflective striped area 32 is referred to as a Type I barricade.

We claim as our invention:

1. A traffic barricade comprising first and second hollow resilient plastic panel members, each panel member comprising a pair of hollow leg portions and at least one hollow cross-bar portion integrally joined to said leg portions, a vertical panel portion adapted to receive warning indicia on at least one side thereof, said vertical panel portion being integrally formed with at least one of said panel members so as to extend above said leg portions, hinge means integrally formed on each of said panel members, the hinge means on each of said panel members being adapted to cooperate with the hinge means on the other to permit said panels to be pivoted relative to each other between a storage position and a use position, stop means on each of said panels for limiting the relative pivotal movement of said panels and defining said use position, and aperture means in each of said panels for permitting ballast to be placed in said hollow legs and cross-bar portions.

2. The traffic barricade of claim 1 wherein said vertical panel portion is formed in said first panel member at a location above said hinge means, said vertical panel portion being formed at an angle relative to the plane of the leg portions and connecting the upper ends of said leg portions whereby said vertical panel portion will be positioned in a vertical plane when the legs of said first and second panel members are spread apart at an angle to the vertical in their use position.

3. The traffic barricade of claim 2 wherein said second panel member is shorter than said first panel member and of a generally H-shaped configuration, said second panel member having its hinge means located adjacent the upper end of its legs.

4. The traffic barricade of claim 1 wherein an open topped housing for receiving and surrounding the base of an auxiliary flasher unit is integrally formed at at least one end of said vertical panel portion.

5. The traffic barricade of claim 4 wherein said open topped housing comprises the aperture means through which ballast can be placed in said first panel member.

6. The traffic barricade of claim 1 wherein said aperture means in said second panel is located at the top of at least one of said leg portions so as to be covered by one of the leg portions on said first panel when said barricade is in its use position.

7. The traffic barricade of claim 1 wherein said vertical panel portion is recessed in the area adapted to receive said warning indicia.

8. The traffic barricade of claim 1 wherein said hollow cross-bar portions have recessed surfaces adapted to receive warning indicia.

9. The traffic barricade of claim 1 wherein the center of gravity of the barricade when unballasted is less than one-half the distance to the top of the vertical panel portion.

* * * * *